A. McD. DUCKHAM AND A. T. KENT.
TUNNEL KILN.
APPLICATION FILED FEB. 27, 1922.

1,424,560.

Patented Aug. 1, 1922.
7 SHEETS—SHEET 1.

UNITED STATES PATENT OFFICE.

ARTHUR McDOUGALL DUCKHAM AND ARTHUR THOMAS KENT, OF LONDON, ENGLAND.

TUNNEL KILN.

1,424,560.          Specification of Letters Patent.      Patented Aug. 1, 1922.

Application filed February 27, 1922. Serial No. 539,636.

*To all whom it may concern:*

Be it known that we, ARTHUR MCDOUGALL DUCKHAM and ARTHUR THOMAS KENT, both subjects of the King of Great Britain, residing in London, England, have jointly invented certain new and useful Improvements in Tunnel Kilns (for which we have made application for patent in Great Britain, dated 29th October, 1920, Serial No. 30,653), of which the following is a specification.

Tunnel kilns are well known and have been extensively used for burning pottery and the like. Their general construction has several drawbacks: for instance, the length of the kiln has to be very considerable in order to obtain economic heating and efficient cooling of the material to be treated; further, it has been difficult to make the heating gases pass evenly throughout the kiln space, the tendency being for the gases to pass along the sides and under the crown of the kiln, leaving the centre and bottom of the material on the trucks less highly heated than the sides and top of the material.

For the purpose of lengthening the path of the gases through the kiln and thus allowing the length of the latter to be reduced, the gases have been caused to travel in a zig-zag path in a vertical plane by causing the trucks to carry baffles at their ends whereby alternate upward and downward direction of the current of gases is secured in successive compartments formed between the baffles. To overcome certain objections to this vertical zig-zag path the tunnel has been arranged with lateral flues for heating gases, combustion products and cooling air so that the gases may follow a horizontal zig-zag path, the gases entering and leaving the compartments formed by the baffles at the sides thereof instead of at the ends; this necessitates baffles which prevent as far as possible passage of gases within the tunnel in the longitudinal direction thereof. So far as the length of the zig-zag path is concerned, constructions hitherto proposed show little advantage in this horizontal arrangement of the path as compared with the vertical.

By the present invention a considerably longer zig-zag path is obtained and the length of the tunnel is considerably shortened by mounting the trucks on their wheels so that the length of the truck is transverse to the length of the tunnel, the flues being arranged laterally to the tunnel, as in the previous construction, so that the zig-zag path is horizontal. The gases enter and leave the compartments formed by the baffles (in this case carried by the side of the trucks or on the longitudinal middle line of the truck), at the ends of the compartments. The ports in the tunnel wall forming the ends of the compartment are spread over a smaller area than in the known construction and the cross section of the compartment is narrower, so that the current of gases through the compartment is more rapid and there is less liability for the gases to pass through the necessary clearance between the baffles and the walls of the tunnel. Such passage of the gases is further hindered, according to the invention, by sealing devices placed at equal distances throughout the tunnel so as to register with the baffles at each step-by-step movement of the trucks. The device for sealing the compartment at the top of its partition wall may take the form of a transverse baffle depending from the roof of the tunnel. Such a depending baffle is more easily kept in repair and is less liable to become distorted than the roof of the tunnel which has hitherto co-operated with the baffles to prevent passage of gases; furthermore these depending baffles need not be arched, whereas an arched construction of the roof is inevitable. When the co-operating edges of the depending baffle and the baffle on the track are straight the seal formed is more likely to be effective than when the edges are curved.

Furthermore, by making each depending baffle of slightly greater depth than that preceding it in the direction of travel of the truck, and the partition walls of such height that they all but touch the last and deepest baffle, it is possible, by piling sand on the upper edge of the partition wall about to enter the tunnel, to ensure that there shall be a sand seal between each baffle and the partition wall as the latter passes through the tunnel.

The device for sealing the compartments on alternate sides of the latter and thus ensuring the zig-zag path of the gases through the compartments may consist of a mechanism which ensures that when the trucks are to be moved by one step through the tunnel, they are all brought to a central position in the tunnel so that they can move without friction of the partition walls against the sides of the tunnel; when this step movement is complete the mechanism moves each truck transversely of the tunnel and in such a manner that partitions 1, 3, 5, etc., are brought into close contact with the right hand side of the tunnel, while partitions 2, 4, 6, etc., are brought into close contact with the left hand side of the tunnel.

In the accompanying drawings

The trucks $a$ are suitably constructed to run on rails $a'$ in the tunnel and carry in known manner depending plates $b$ which extend into sand troughs $c$ for the purpose of preventing, as far as possible, access of hot gases from the upper part of the tunnel to the part below the trucks.

At each end of the tunnel is a traverser (not shown); that at the exit end (the left hand end in Fig. 3) receives the issuing truck and conveys it to the track $e$ on which it is unloaded and re-loaded and then run on to the traverser at the other end (at that time at the head of the track $e$), which carries it to the entrance end of the tunnel and places it substantially in contact with the first truck of the continuous line of trucks in the tunnel. A suitably driven pushing mechanism $f$ now advances the line of trucks by the width of one truck, whereby the truck on the traverser at the entrance end is pushed towards the tunnel and a truck is pushed on to the traverser at the exit end. The pushing mechanism here shown comprises the pusher $f$ which is advanced by a rack fixed to it and engaged with a pinion $f'$ which is free to turn on the shaft $f^2$ but can be made fast on the shaft by means of the sliding clutch $f^3$. The shaft $f^2$ is driven by the motor $f^4$ through worm gear $f^5$.

Figures 4, 8, 9:
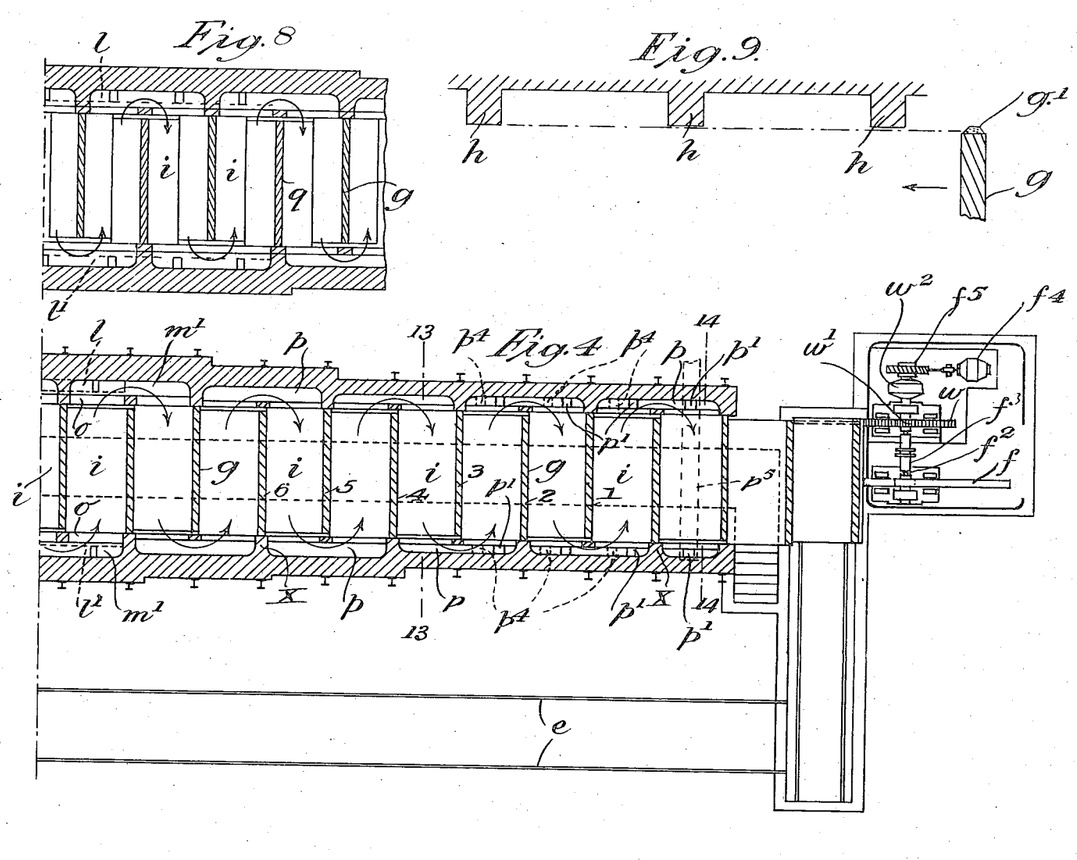
Fig. 8 is a part sectional plan similar to Fig. 4 but showing the modification.
Fig. 9 is a fragmentary section explanatory of the mode of sealing the chamber.
Figure 6:
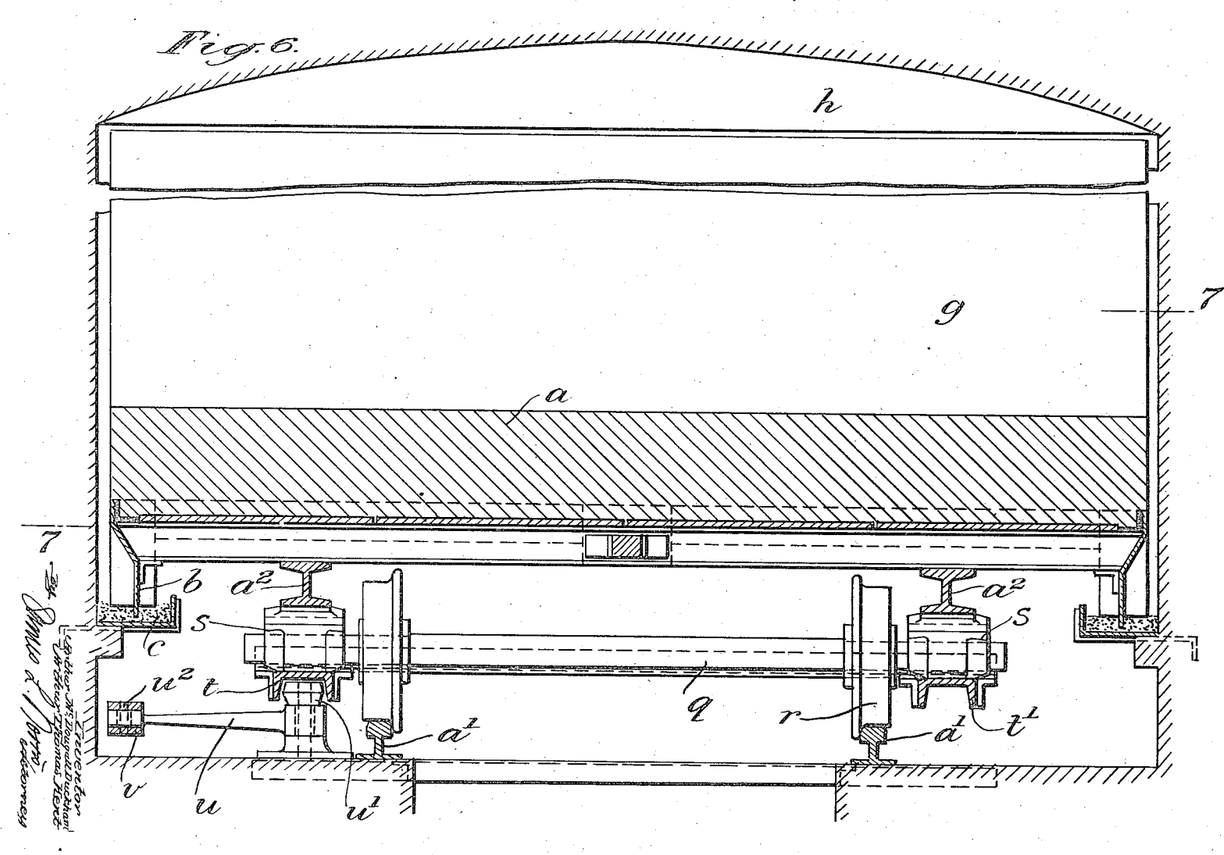
Figure 7:
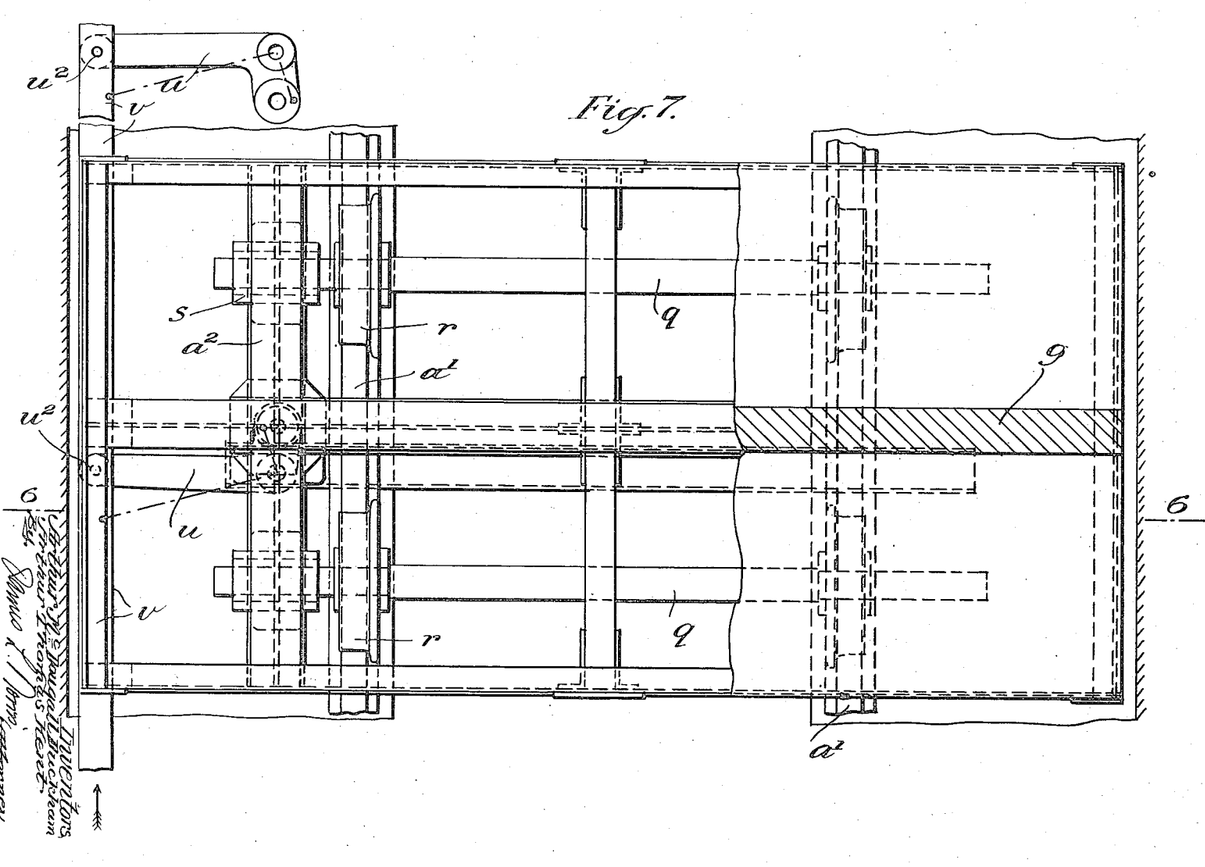
Fig. 7 is a sectional plan on the same scale as Fig. 6 and on line 7—7 thereof.
Figure 10:
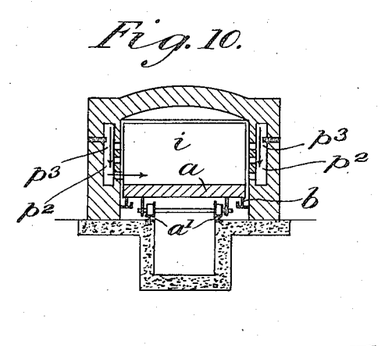
Figs. 10, 11, 12 are cross sections on lines 10—10, 11—11, and 12—12 respectively of Fig. 3, and Figs. 13 and 14 are cross sections on lines 13—13 and 14—14 respectively of Fig. 4.
Figure 11:
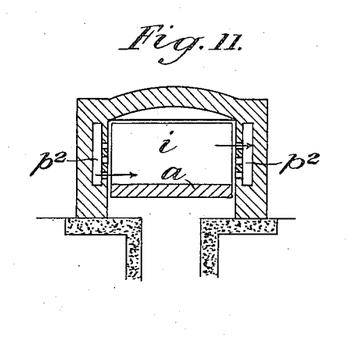
Figure 12:
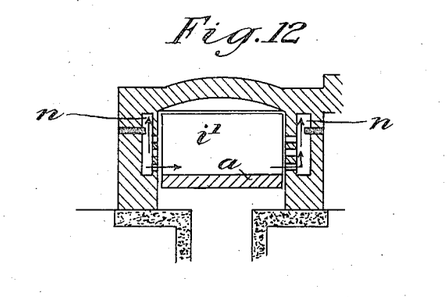
Figure 13:
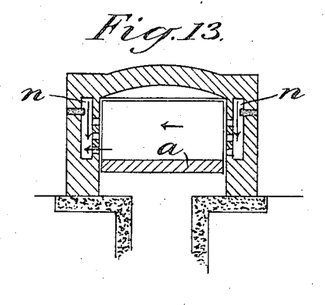

Each truck carries a longitudinal fire-brick wall $g$ either at one side as shown in Fig. 4, or on the longitudinal middle line of the truck as shown in Figs. 6, 7 and 8, and the roof of the tunnel is built with downwardly projecting transverse baffles H at a distance apart corresponding with the width of a truck. When the line of trucks is advanced by the width of one truck, as already described, the wall of each truck comes into register with the next baffle $h$, so that except during the periods of movement the tunnel is subdivided into a number of chambers $i$, each containing a load of goods.

As shown in Fig. 9 each baffle $h$ is slightly deeper than the next preceding one in the direction of advance of the partition $g$, as indicated by the arrow. Sand $g'$ is piled on each wall before it enters the tunnel and a portion of this pile is swept off by each baffle as the wall comes into position beneath it.

The chambers about the middle of the tunnel are those in which the goods are most highly heated. The goods in the chambers at the entrance end are being heated by waste heat and the goods in the chambers at the exit end are being cooled by the air for combustion.

Figure 5:
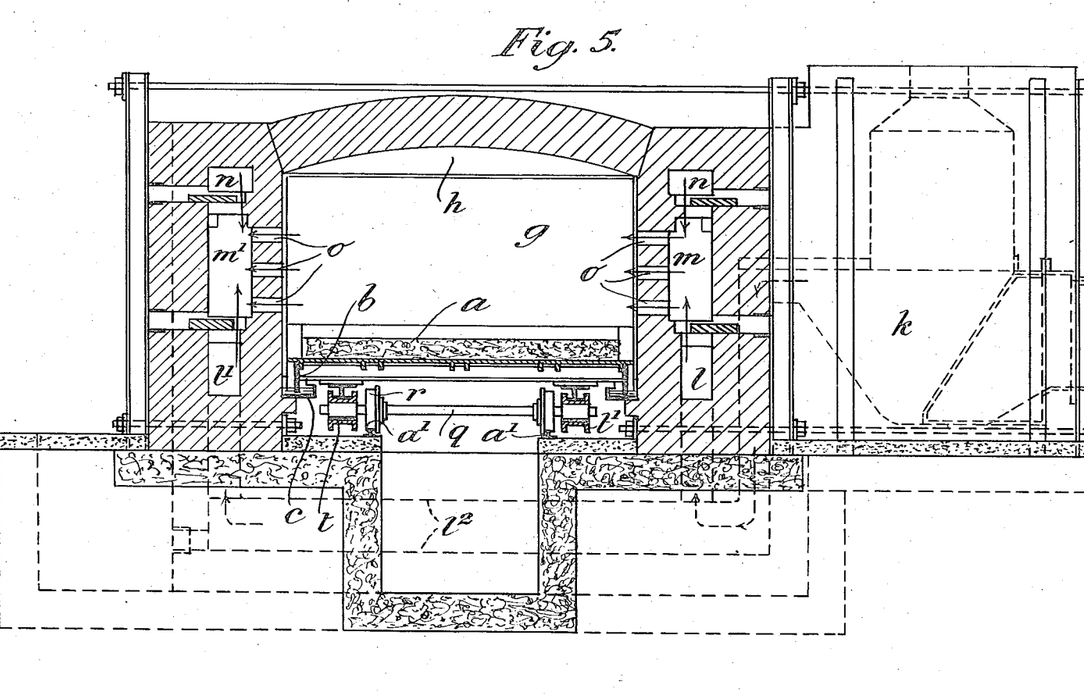
Fig. 5 is a cross section on line 5—5 of Fig. 3 drawn to an enlarged scale, and Fig. 6 showing a modification is a cross section on line 6—6 of Fig. 7 drawn to a still larger scale.

For this purpose the gases from the producers $k$ enter flues $l$, $l'$ which communicate with each other through flue $l^2$, and pass into combustion chambers $m$, $m'$ where they meet secondary air drawn through flues $n$ (Fig. 5). It will be noted that while combustion chamber $m$ appertains only to one of the chambers $i$, each combustion chamber $m'$ is common to two chambers $i$ so that these combustion chambers form connecting flues which enable products of combustion to pass through ports $o$ (Fig. 5) into and along each chamber $i$ in a zig-zag path.

Figure 14:
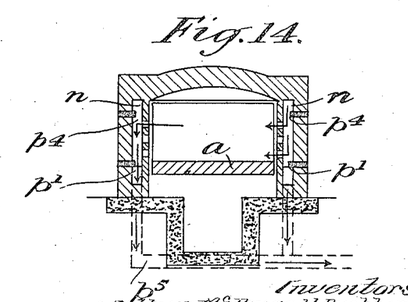

From the last combustion chamber $m'$ the zig-zag passage of the products of combustion continues, the chambers $i$ being now connected by waste heat flues $p$, from the last of which the gases are drawn off through ports $p'$ into the chimney flue $p^5$ shown in Figs. 4 and 14.

At the exit end of the tunnel the chambers $i$ are connected by the flues $p^2$, the first three or four of which have ports $p^3$ for entry of air. This air traverses the goods in zig-zag path until it arrives at the chamber $i'$, where it ascends, highly heated, into flues $n$. From these flues some of the heated air enters the several combustion chambers $m$ $m'$ as already described; the rest passes on to the entrance end of the tunnel where it enters the first chamber through ports $p^4$ and passes through this chamber to dry the goods and leaves by the port $p'$ opposite to the end of the chamber at which the air enters; if desired the said port $p'$ being closed the air leaving the first chamber may pass through the second or the second and third leaving the chamber which it last traverses by the port $p'$ corresponding with that chamber. In such case the waste gases leave by the port $p'$ corresponding with the second, third or fourth chamber. In this manner the heated air is caused to dry the goods.

Figure 1:
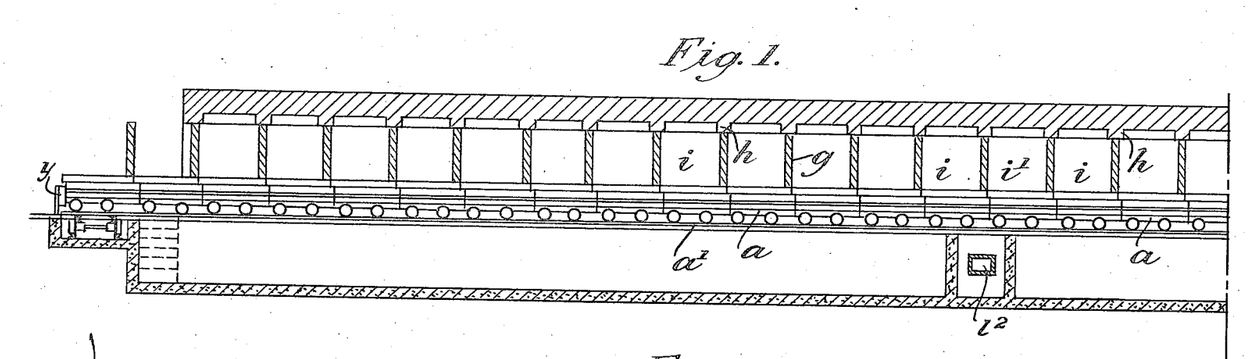
Figs. 1 and 2 are a longitudinal section and Figs. 3 and 4 are a sectional plan of a tunnel kiln constructed according to the invention.
Figure 2:
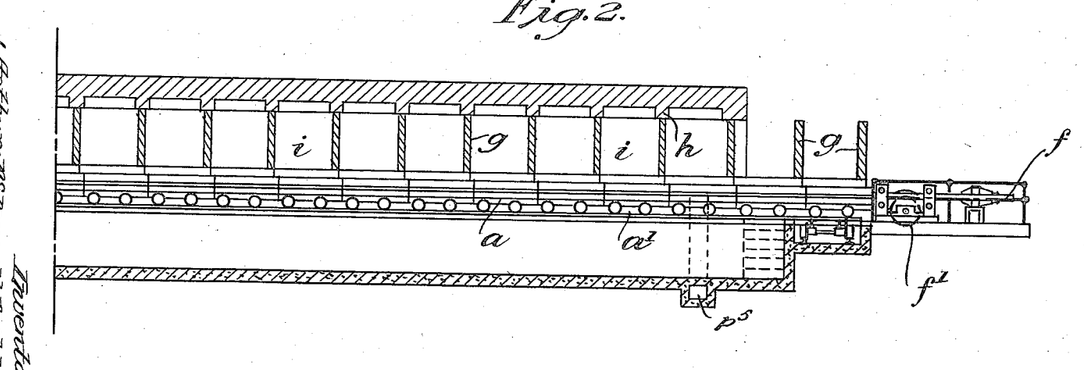
Figure 3:
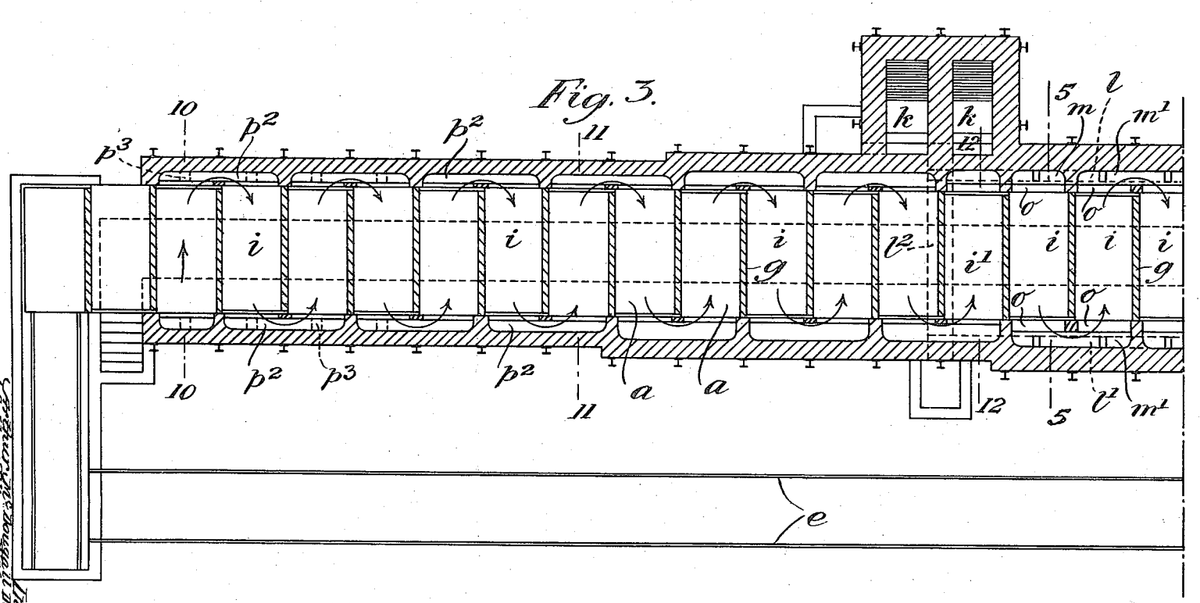

It will be seen in Figs. 3 and 4 that partition walls $g$ are all in contact at one end with a side of the tunnel and at opposite ends in adjacent chambers. This alternating contact preserves the zig-zag path. Before the line of trucks is advanced, each truck must be brought into the position shown in Figs. 5 and 6, that is to say with each end of the partition wall $g$ free of the side wall of the tunnel. For this purpose as shown in Figs. 6 and 7 the bearings $s$ of the truck are capable of sliding on the axles of the wheels $r$ and the bearings $s$ in which the axles turn are connected by channel irons $t, t'$. At the middle line of the truck the channel iron $t$ is engaged by a roller $u'$ pivoted on the short arm of a bell crank $u$, the long arm of which is pivoted at $u^2$ to a bar $v$ extending throughout the length of the tunnel. At the entrance end of the tunnel this bar is connected with a rack $w$ in gear with a pinion $w'$ free on the shaft $f^2$ but capable of being made fast thereon by the sliding clutch $f^3$.
When a freshly charged truck is in position to be introduced into the tunnel, the clutch $f^3$ is engaged with the pinion $w'$ and the motor $f^4$ is started; the bar $v$ is thus given a short movement in the direction of the arrow in Fig. 7 whereby the bell crank $u$ is moved from the position shown in dotted lines into that shown in full lines. This movement brings the truck from the position it had with its partition wall $g$ in contact with the wall $x$ of the tunnel into the central position shown in Figs. 7 and 8.
Clutch $f^3$ is now moved out of engagement with pinion $w'$ and into engagement with pinion $f'$ so that the whole line of trucks is pushed forward through a distance equal to the breadth of a truck. During this movement the channel iron $t$ disengages itself from roller $u'$ and engages itself with the roller $u'$ of the next bell crank $u$. When the truck which is issuing from the tunnel has come to rest against buffer $y$ (Fig. 1) the motor $f^4$ is brought to rest. To provide for the difficulty of synchronizing this last operation with the coming to rest of the line of trucks, friction coupling $w^2$ (Fig. 4) is provided.
Clutch $f^2$ is now disengaged from pinion $f'$ and reengaged with pinion $w'$, and the motor is again started in the reverse direction. Bar $v$ is thereby returned to its original position and the truck with which bell crank $u$ is now engaged is moved so that its partition wall $g$ comes in contact with wall $x$ of the tunnel. In order to afford a certain amount of lost motion in this movement the bearings $s$ of the axles of the truck are mounted to slide with considerable friction in the transverse guides on the under surfaces of the girders $a^2$ of the truck.
It will be noted that in order that the lateral movement imparted to each truck may be in the direction opposite to that imparted to the truck next to it, the short arm of each lever $u$ must be turned in the direction opposite to that of the lever $u$ next to it, as shown in Fig. 7.

Having thus described the nature of the said invention and the best means we know of carrying the same into practical effect, we claim:—

1. A tunnel kiln of the kind in which the gases have a horizontal path longitudinally of the tunnel, comprising trucks arranged so that the length of the truck is transverse to the length of the tunnel and baffle walls carried by the said trucks parallel to the length of the truck.

2. A tunnel kiln of the kind in which the gases have a horizontal path longitudinally of the tunnel, comprising trucks arranged so that the length of the truck is transverse to the length of the tunnel, baffle walls carried by the said trucks parallel to the length of the truck and baffles depending from the roof of the tunnel adapted to register with the said baffle walls.

3. A tunnel kiln of the kind in which the gases have a horizontal path longitudinally of the tunnel, comprising trucks arranged so that the length of the truck is transverse to the length of the tunnel, baffle walls carried by the said trucks parallel to the length of the truck, baffles depending from the roof of the tunnel adapted to register with the said baffle walls and of successively greater depth in the direction of the travel of the baffle walls, and a sand seal on the upper edge of each baffle wall adapted to be in part removed by each depending baffle as the baffle wall travels beneath the said baffle.

4. A tunnel kiln of the kind in which the gases have a horizontal path longitudinally of the tunnel, comprising trucks arranged so that the length of the truck is transverse to the length of the tunnel, baffle walls carried by the said trucks parallel to the length of the truck and means for preventing passage of gases between the wall of the kiln and one end of each baffle wall, the said means being operative at the same end of alternate baffle walls and at the opposite end of the remaining baffle walls.

5. A tunnel kiln of the kind in which the gases have a horizontal path longitudinally of the tunnel, comprising trucks arranged so that the length of the truck is transverse to the length of the tunnel, baffle walls carried by the said trucks parallel to the length of the truck and means for moving each truck transversely of the tunnel both before and after it is moved longitudinally of the tunnel, for the purpose set forth.

6. A tunnel kiln of the kind in which the gases have a horizontal path longitudinally of the tunnel, comprising trucks arranged so that the length of the truck is transverse to the length of the tunnel, baffle walls carried by the said trucks parallel to the length of the truck, a reciprocating bar extending through the length of the tunnel and means connecting each truck with the said bar and adapted to reciprocate transversely of the tunnel at each reciprocation of the said bar.

7. A tunnel kiln of the kind in which the gases have a horizontal path longitudinally of the tunnel, comprising trucks arranged so that the length of the truck is transverse to the length of the tunnel, baffle walls carried by the said trucks parallel to the length of the truck, a reciprocating bar extending through the length of the tunnel, bell-cranks corresponding in number with the trucks and each connected at one end with the said bar and at the other end with the corresponding truck, and means for reciprocating the said bar.

8. A tunnel kiln of the kind in which the gases have a horizontal path longitudinally of the tunnel, comprising trucks arranged so that the length of the truck is transverse to the length of the tunnel, baffle walls carried by the said trucks parallel to the length of the truck, a reciprocating bar extending through the length of the tunnel, bell-cranks corresponding in number with the trucks, consecutive bell-cranks being operative in opposite directions, means connecting each bell crank at one end with the said bar and at the other end with the corresponding truck, and means for reciprocating the said bar.

9. A tunnel kiln of the kind in which the gases have a horizontal path longitudinally of the tunnel, comprising trucks arranged so that the length of the truck is transverse to the length of the tunnel, baffle walls carried by the said trucks parallel to the length of the truck, a reciprocating bar extending through the length of the tunnel, bell-cranks corresponding in number with the trucks, consecutive bell-cranks being operative in opposite directions, means connecting each bell crank at one end with the said bar and means automatically engaging it at the other end with a truck advancing into register with it and automatically disengaging it from a truck leaving it.

10. A tunnel kiln of the kind in which the gases have a horizontal path longitudinally of the tunnel, comprising trucks arranged so that the length of the truck is transverse to the length of the tunnel, and subdividing the tunnel into compartments, means for preventing passage of gases through the tunnel except in the zig-zag path, means for passage of combustion gases through the compartments from about the middle of the length of the tunnel to the entrance end, means for passing air through the compartments from the exit end to about the middle of the length of the tunnel, flues longitudinal of the tunnel into which some of the said air enters at about the middle of the length of the tunnel, the said flues extending to the entrance end of the tunnel, and ports for admitting air from the said flues into the compartments at the said entrance end.

In testimony whereof we have signed our names to this specification.

ARTHUR McDOUGALL DUCKHAM.
ARTHUR THOMAS KENT.